(12) United States Patent
Kroman

(10) Patent No.: US 6,260,964 B1
(45) Date of Patent: Jul. 17, 2001

(54) CLIP-ON SHIELD FOR SPECTACLES AND A COMBINATION OF A REMOVABLE SHIELD AND A PAIR OF SPECTACLES

(75) Inventor: Flemming Kroman, Brabrand (DK)

(73) Assignee: Lindberg A/S, Abyjoj (DK)

( * ) Notice: Subject to any disclaimer, the term of this patent is extended or adjusted under 35 U.S.C. 154(b) by 0 days.

(21) Appl. No.: 09/698,391

(22) Filed: Oct. 27, 2000

Related U.S. Application Data

(63) Continuation-in-part of application No. PCT/DK99/00259, filed on May 7, 1999, now abandoned.

(30) Foreign Application Priority Data

May 7, 1998 (DK) .................................................. 0631/98

(51) Int. Cl.⁷ .................................................. G02C 9/00
(52) U.S. Cl. .............................................. 351/47; 351/57
(58) Field of Search .................. 381/47, 48, 57, 381/58, 41, 44, 158

(56) References Cited

U.S. PATENT DOCUMENTS

| | | |
|---|---|---|
| 3,770,343 | 11/1973 | Masucci . |
| 4,163,607 | 8/1979 | Nannini . |
| 4,247,178 | 1/1981 | Cook . |
| 4,890,910 | 1/1990 | Gazeley . |
| 5,614,963 | 3/1997 | Parker . |
| 5,883,688 * | 3/1999 | Chao ...................................... 351/47 |
| 5,920,369 | 7/1999 | Kroman . |

FOREIGN PATENT DOCUMENTS

| | | |
|---|---|---|
| 27 18445 C2 | 5/1984 | (DE) . |
| 0 246 688A1 | 11/1987 | (EP) . |
| 0 723 177A1 | 7/1996 | (EP) . |
| 2 236 196A | 3/1991 | (GB) . |

* cited by examiner

Primary Examiner—Hung Xuan Dang
(74) Attorney, Agent, or Firm—Thomas R. Vigil

(57) ABSTRACT

A shield (2) for selective fitting on a pair of spectacles (2) comprises shield glasses, a shield frame and shield guide faces (8). The spectacles comprise a spectacle frame with frame guide faces (3, 19, 20), which are oriented generally perpendicular to or in an oblique direction relative to the spectacle glasses. The spectacle guide faces and the shield guide faces are adapted to permit sliding the shield into a secured position, while preserving the mutual orientation of the shield and the glasses during a final stage of approach.

19 Claims, 5 Drawing Sheets

CLIP-ON SHIELD FOR SPECTACLES AND A COMBINATION OF A REMOVABLE SHIELD AND A PAIR OF SPECTACLES

CROSS-REFERENCE TO RELATED APPLICATIONS

This is a continuation-in-part of International Patent Application PCT/DK99/00259 with an international filing date of May 7, 1999, now abandoned. This application is based on application No. 0631/98 filed in Denmark on May 7, 1998, the contents of which are incorporated hereinto by reference.

BACKGROUND OF THE INVENTION

1. Field of the Invention

The present invention relates to a clip-on shield for spectacles wherein the shield is secured to the spectacles by means of a clip-on device to allow occasional use thereof over ordinary lenses.

The invention further relates to a combination of a removable shield and a pair of spectacles.

The term "spectacles" is used herein to designate the well known optical accessory which basically comprises a pair of lenses made from glass or other refractive material, usually made according to an optician's prescription and intended for being worn by a wearer in order for him to enjoy an optically corrected view by seeing through them, and provided with fitting means for conveniently securing the lenses in the preferred in-use position in which the wearer is offered the possibility of looking straight through the respective lenses while both eyes have generally parallel directions of vision.

Occasionally a bespectacled person may want to use a pair of auxiliary lenses together with his or her spectacles, most often a pair of tinted lenses adapted for reducing sunglare. Although such items are referred to herein as lenses, this is not intended to signify that they would necessarily include optically refractive means, in most cases they rather include some type of optical filters known in the art.

As generally known in the art, the occasional use of auxiliary lenses by bespectacled persons is facilitated by fitting the lenses in the form of a detachable shield, i.e. in the form of an accessory with fitting means adapted for detachable fastening onto the spectacles in such a manner that the shield lenses are secured in a position to substantially cover the ordinary lenses in a slightly spaced surface to surface relation. Such a shield essentially comprises two shield lenses, a bridge designed to straddle over the wearer's nose and means for detachable fitting of the shield acccessory over the spectacles.

2. Description of the Prior Art

DE patent No. 27 18 445 teaches an accessory shield which comprises two clips or clamps arranged to allow the accessory shield to be mounted on the spectacles by being shifted downwards over the spectacles from above and constructed to obtain flexible securing by means of tongues which engage and clamp the front and the back of each of the lenses in a substantially vertically extending area adjacent to the inner rim, i.e. generally close to the wearer's nose. Each of the clips is further provided with a connecting branch adapted for abutment on a top frame portion of the spectacles.

Although simple and commonly used, shields of this general type are associated with certain drawbacks. From an aesthetical point of view, they are rarely accomplished since they easily slide and become awry. Usually, the abutment on the top frame of the spectacles is not sufficient to ensure stable centering and perfect orientation, since most often the top frame of the spectacles extends in a curved manner, which means that the shield comes to rest on a curved area where the shield is likely to slide sideways. In order to provide such a shield with the capacity of fitting over any among a range of spectacles where the spacing between the inner rims of the lenses and the corresponding rims of the frame, respectively, varies, the clips must be adapted with a width sufficient to straddle the wider spacing. Hereby the clips will on the majority of spectacles, where the rim spacing is average or below average, engage the lenses at zones relatively far away from the rims.

Moreover, it is difficult to ensure stable fitting of the flexible clips onto any thickness of frames and lenses, and since different wearers wear different thicknesses of frames and lenses, some wearers are unable to use shields with this type of fastening means.

During mounting and dismounting the flexible clips are to slide up and down over the support areas in the full vertical extent of the clip which involves a risk of scratching both the front and the back of the lenses. Often, the movement becomes irregular with lateral displacements due to the two spring clips engaging curved portions of respective lens rims, while the user attempts to displace the shield vertically. This means that the area exposed to such scratching is comparatively large. In case of lenses made of glass, this does not present a problem, however, in case of lenses made from plastics, it is not acceptable.

Since many wearers prefer plastic lenses, e.g. because they favor low weight or shatterproofness, fastening means which do not cause scratching problems are very much in demand.

The movement for applying the shield onto the spectacles as well as the movement for removing the shield are generally oriented parallel to the plane of the glass surfaces. This manipulation is difficult to accomplish without the user having to remove the spectacles.

U.S. Pat. No. 5,920,369 discloses a removable shield with a central connection bridge provided with hook projections adapted to engage the spectacle nose bridge. The shield may also be provided with guide pegs in lateral positions, oriented generally perpendicular to the glasses and adapted to engage apertures in the spectacle frame adjacent the hinges. This shield is applied from the front. Application of this shield neccesitates registrering the hook projections with the nose bridge and registering the lateral pegs. Generally the user will register first the hook projections and will subsequently register the pegs, one at a time. This shield achieves a good fit and a good hold on the spectacles, but at the cost of a somewhat complicated handling which the user may not find easy, at least not unless the spectacles are removed during this operation.

U.S. Pat. No. 5,614,963 illustrates a combination of a removable shield and a pair of spectacles in which the spectacle frame is provided with lateral protuberances, each protuberance being provided with a bore, which bore is oriented generally perpendicular to the glass surfaces. The shield is provided with lateral pin members adapted for registering in respective bores. The pin members may be bifurcated with fork ends adapted for securing the shield. The part of the shield intermediate the pegs is secured to the glasses by means of patches of mating hook and loop pile fastening material.

Thus, this prior art relies on dedicated attachment means on the eyeglasses which may create an undesirable bulky look. The parts require delicate manufacturing and delicate matching, and additional means need to be provided in order to secure a good fit.

SUMMARY OF THE INVENTION

The invention, in a first aspect, provides a clip-on shield for a pair of spectacles, which pair of spectacles comprises a pair of spectacle glasses, a spectacle frame with lateral portions, which lateral portions provide frame guide faces oriented generally perpendicular to the plane of the spectacle glass surfaces, and temples connected with the spectacle frame by hinges, said shield comprising a shield frame, shield glasses, lock means for securing said shield to the spectacle frame and shield guide faces, wherein said shield guide faces are adapted for cooperation with the frame guide faces so as to permit sliding said shield along a direction generally perpendicular to the plane of the spectacle glass surfaces and into a secured position, while preserving the mutual orientation of said shield and the spectacle glasses during a final stage of approach.

This shield is adapted for use on a pair of spectacles which comprises guide faces. The guide faces may be provided by parts of the spectacle frame, e.g. parts of the hinges. Thus, the guide faces may be small and unobtrusive in the appearance of the spectacles. During application of this shield, the mutual orientation of the shield and the glasses is controlled during a final stage of approach. This avoids any risk of accidentally contacting the shield glasses with the spectacle glasses.

The control of the orientation should generally at least apply to the inclination or the attitude of the shield relative to the glasses. The control of the orientation should not be too narrow in respect of the bearing or the azimuth angle, as it should allow fitting one lateral side of the shield on the glasses prior to the fitting of the opposite side. The control of the orientation by mutually cooperating guide faces according to the invention does not exclude the option of backing-up the control by other motion limiters, such as spacers, etc. The control of the orientation should be suitable to ensure that no accidental, undesired contact between the shield glasses and the spectacle glasses may occur during this succession of steps. Hereby the invention substantially facilitates application of the shield.

A preferred embodiment calls for spacer means adapted to maintain a spacing between the shield glasses and the spectacle glasses. The spacer means preferably comprises a pad of soft material. This provides a positive spacing between the glasses, and thus controls any risk of unintentional scratching. The pad may provide a double utility by also being used as a base for securing a part of the shield frame vis-a-vis the glasses.

According to a preferred embodiment, the lock means comprises resilient means and a pair of retainers adapted for retaining the shield in the secured position. This provides an easy snap fitting and avoids any play in the fit. The spring may may be implemented by any suitable means, e.g. by dedicated spring means, such as a strip of resilient plate.

According to a preferred embodiment, the shield guide faces are adapted to engage the spectacle frame in zones adjacent respective hinges for the temples. This provides an optimum control of the shield attitude or shield orientation. The structural details are thus gathered in the zones adjacent the hinges which provides an aesthetically accomplished solution. Manipulating the shield may also be confined to the zones adjacent the hinges where access is easy and where risk of accidentally touching and possibly staining the glasses is at a minimum.

The shield guide faces may be provided in a pair of slide blocks, which slide blocks may comprise shoes of low-friction resilient material. This provides for easy sliding of the shield and avoids scratching or damaging the spectacle frame.

The invention, in a second aspect, provides a combination of a removable shield and a pair of spectacles, said pair of spectacles comprising a pair of spectacle glasses, a spectacle frame with lateral portions, which lateral portions provide frame guide faces oriented generally perpendicular to the plane of the spectacle glass surfaces, and temples connected with said spectacle frame by hinges, said shield comprising a shield frame, shield glasses, lock means for securing said shield to said spectacle frame and shield guide faces, wherein said shield guide faces are adapted for cooperation with said frame guide faces so as to permit sliding said shield along a direction generally perpendicular to the plane of said spectacle glass surfaces and into A secured position with said shield glasses generally parallel to the plane of said spectacle glasses, wherein said spectacle guide faces and said shield guide faces are adapted to permit sliding said shield into the secured position, while preserving the mutual orientation of said shield and said spectacle glasses during a final stage of approach.

This achieves the advantages as enumerated above in the context of the shield.

According to a preferred embodiment, at least one of the pair of spectacles and the shield comprises a resilient means and the lock means comprises a pair of retainers, each one of the retainers being adapted for engaging the pair of spectacles at a zone adjacent a respective one of the hinges.

This provides an easy snap fitting and avoids any play in the fit. The spring may in this case be provided by various means, such as by including springs, by making the shield frame or parts hereof of a resilient material, by making the spectacle frame or parts hereof from a resilient material or by a combination of these means.

According to a preferred embodiment, the shield guide faces are provided in a pair of slide blocks. The provision of slide blocks to be assembled with the remaining portion of the shield frame offers the possibility of adapting the shield to different types of spectacles merely by providing different sets of dedicated slide blocks. Adaptation to different thicknesses of spectacle glasses, such as may arise in case of prescription glasses, may also be accommodated for by providing a range of different slide blocks. This facilitates logistics and widens the application range.

Further embodiments appear from the dependent claims.

BRIEF DESCRIPTION OF THE DRAWINGS

The invention will now be described in further detail with reference to the specific embodiments shown in the drawings. In the drawings

DESCRIPTION OF THE PREFERRED EMBODIMENTS

Figure 1:
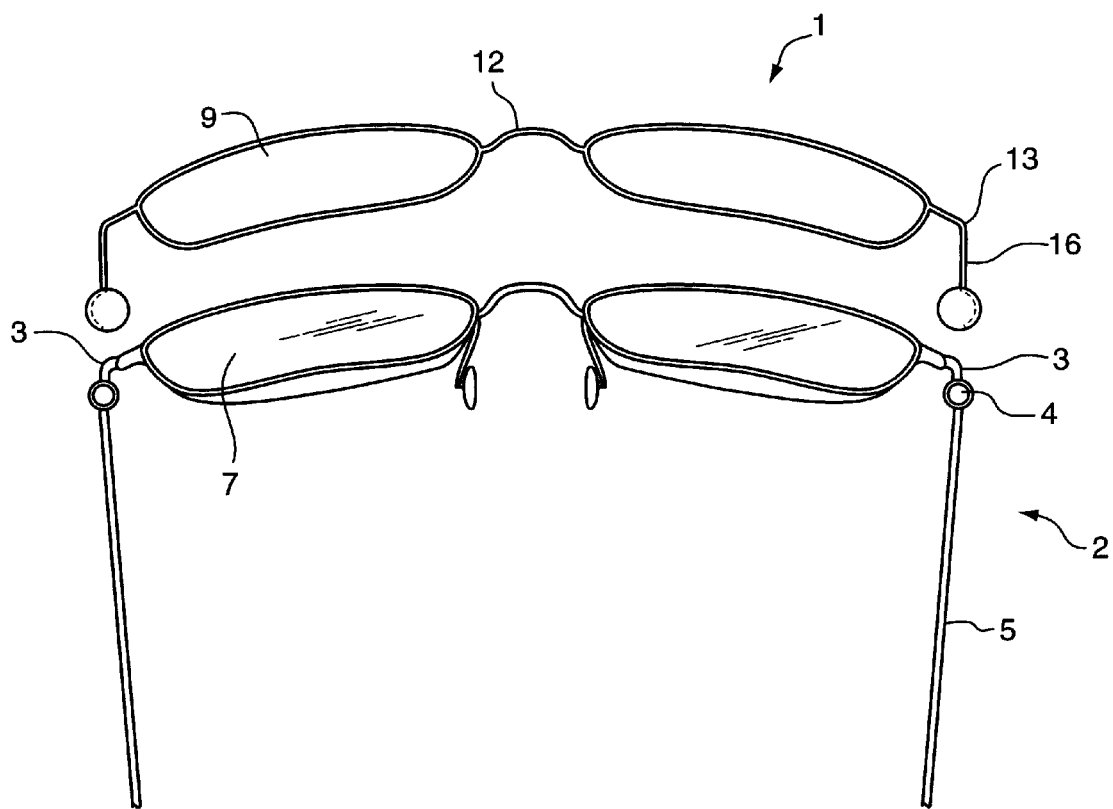
FIG. 1 is a plan view of a shield and a pair of spectacles in a separated arrangement just prior to being engaged.

All figures are schematic and not necessarily to scale and illustrate only details essential to the understanding of the invention while other details have been omitted. In all figures the same reference numerals are used to designate identical or similar items.

Figure 3:
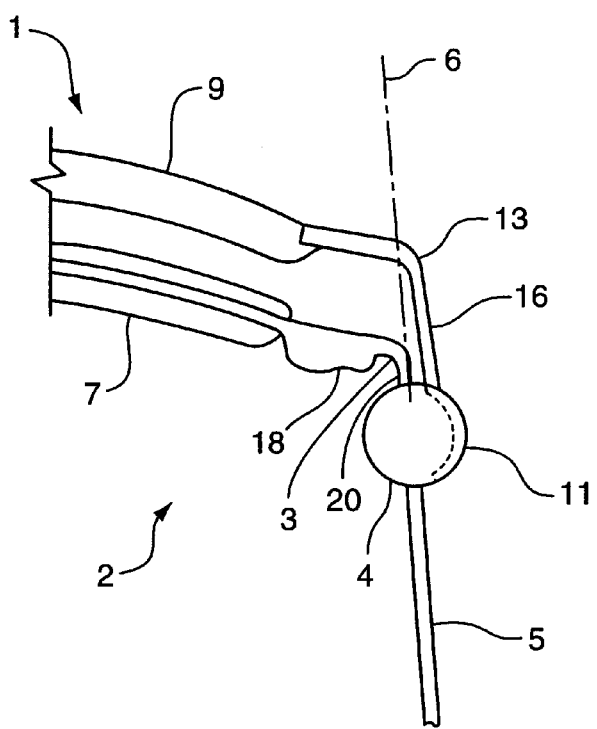
FIG. 3 is an enlarged detail from FIG. 2.

Reference is first made to FIG. 1 which illustrates a plan view of a shield 1 placed adjacent to, but slightly spaced in front of a pair of spectacles 2. The spectacles comprise spectacle glasses 7, spectacle hinges 4, temples 5, and a frame, which frame at the lateral portions provides guide faces 3. The shield comprises shield glasses 9 and a shield frame. The main component of the shield frame is a shield beam 12 with extended lateral end portions. Referring to FIG. 3, these end portions of the shield beam 12 are angled at knees 13 from where they continue by respective extensions 16 which terminate in respective curved parts generally referred to as the retainers 11.

Figure 2:
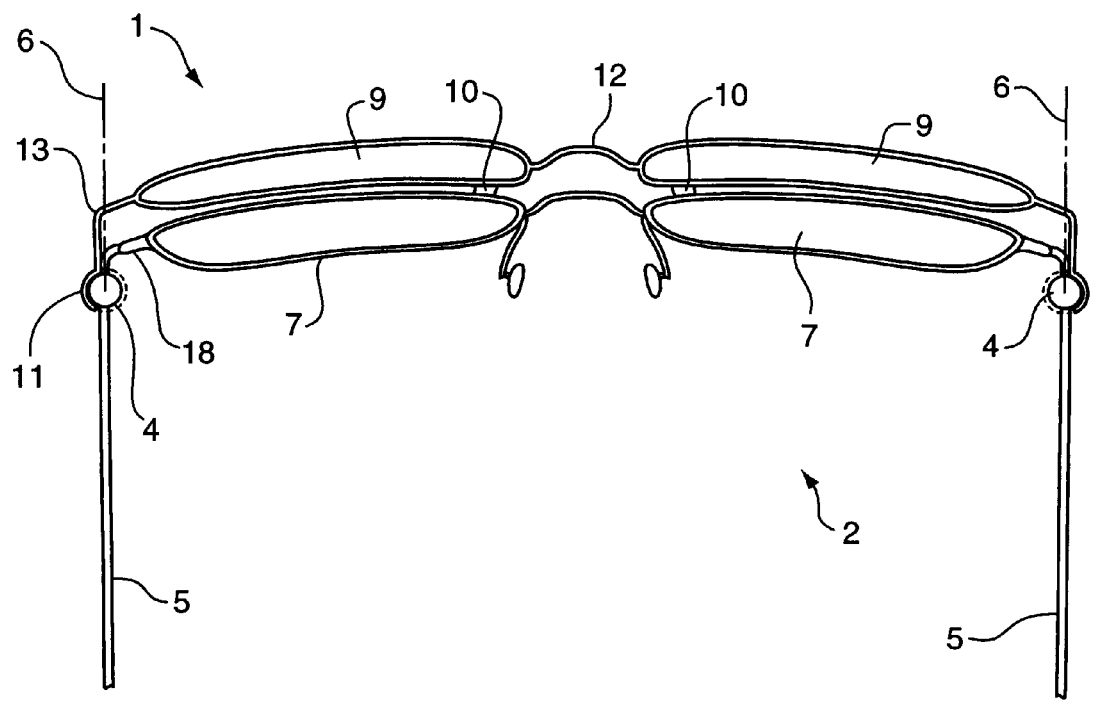
FIG. 2 illustrates a plan view of the shield and the spectacles in a mutually secured position.

FIG. 2 illustrates the same portions as FIG. 1, but in a situation where the shield has been fitted onto the spectacles and thus secured to the spectacles.

The spectacles 2 comprise temples 5 secured to the frame by means of spectacle hinges 4. The spectacle hinge provides a bulged portion with an approximately cylindrical outline, as illustrated in FIG. 3.

The shield beam 12 comprises a resilient piece of material in order that the shield as a whole appears as a resilient structure, referring also to FIG. 2. The two rounded retainers 11 are adapted to engage the respective bulged parts provided by the hinges 4 and laterally clamp them by the resilient force of the shield beam. The retainers are adapted to match the bulged parts in order to provide a snug fit.

The knee 13 at the lateral part of the beam 12, which knee connects the rear extension 16 with the front part of the shield, provides a salient which presents itself as a convenient touch point in manipulations of the shield. The knee is readily engaged by the user with his fingers without any fingers having to approach the shield glasses or the spectacle glasses. Thereby the shield offers the possibility of being manipulated with no risk of unintentional staining or scratching of any of the glasses.

Figure 4:
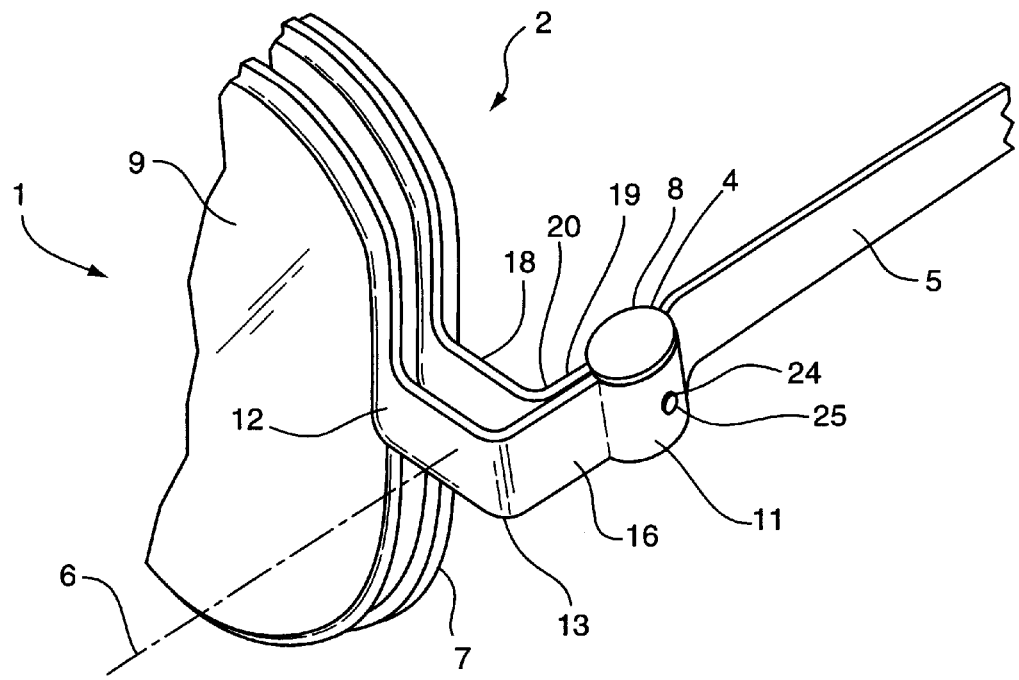
FIG. 4 shows an isometric view of a detail from a shield according to a first embodiment of the invention, and as secured onto a pair of spectacles.
Figure 5:
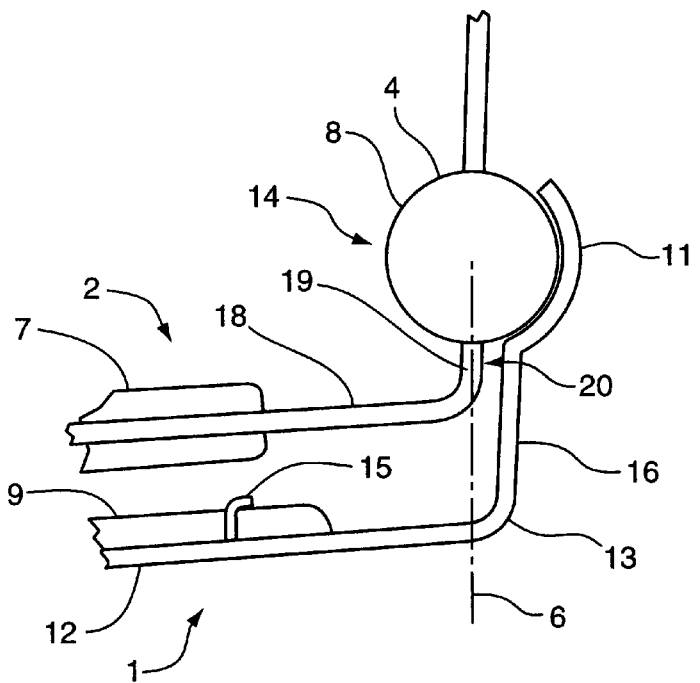
FIG. 5 illustrates the detail from FIG. 4 in plan view.

Reference is now made to FIGS. 4 and 5 for a description of the guide faces. FIGS. 4 and 5 illustrate parts of the spectacle frame, in order to illustrate how the frame is cut and shaped from a sheet material, the spectacle frame comprising a lateral extension provided by a strip of metal with generally parallel edges, which strip is angled and provides one of the parts of the hinge. The temple similarly comprises a strip of sheet material also with generally parallel edges. The hinge proper comprises an essentially cylindrical component, and the vertical extension of the hinge is generally equivalent to the vertical extension of the strip parts of the spectacle frame and temple.

A pair of spectacles with a hinge of this shape is the subject of a c-i-p application Ser. No. 09/541,789, filed on Apr. 3, 2000, the contents of which are incorporated hereinto by reference. The invention is well suited for the spectacles illustrated in this patent application, but also applicable to other spectacles.

The rearward extension of the spectacle frame 16 together with parts of the hinge 4 provides spectacle guide faces. The spectacle guide faces more particularly comprise upper and lower edges 19 of the rearward extension together with the upper and the lower faces of the hinge. The guide faces further comprise the lateral face 20 of the rearward extension 16 together with the lateral exterior side of the hinge 4. These guide faces, which are referenced 3 as a whole, refer also to FIGS. 1 and 2, define an axis of displacement 6 generally parallel to the edges of the rearward frame extension 16. Respective guide faces at the respective sides of the spectacle frame define respective axes which may be mutually parallel, or which may include a mutual angle.

As illustrated in FIGS. 4 and 5, the shield, at each lateral side, comprises a shoe 14 fitted on the extension 16. This shoe 14 provides shield guide faces 8 which are adapted for cooperating engagement with the respective spectacle guide faces in order to control shield orientation during the final stages of approach. The shoe may comprise a plastics material, e.g. polycarbonate. In the first embodiment, re. FIGS. 4 and 5, the shoe provides the retainer 11, i.e. a part with a concave inner face adapted to match the lateral face of the hinge bulge. In other embodiments (not shown), the shoe merely has the form of a liner inside a curved end portion of the extension 16, which curved portion end is provided by suitable shaping of an end portion of the strip of material that provides the root of the extension 16. Generally, the shoe comprises a low-friction material in order to-facilitate mutual sliding of cooperating guide faces.

The spectacle guide faces, the shield and the shield guide faces are adapted in order that the shield guide faces may register the respective spectacle guide faces on both sides in a relieved state, whereas the shield guide faces are forced to gradually spread during the phase of sliding the shield into the snapping engagement. The spreading of the shield guide faces is permitted by the beam 12 being resilient in bending. This permits easy registry of the shield onto the spectacles, and following displacing the shield into the secured position, a positive grip with no play.

During application of the shield, the shield and the glasses are mutually approached, and the faces of the shoe guide the shield, once they have engaged the spectacle lateral parts, commencing from the spectacle frame knees. Further displacement, which takes the shield backwards until the retainer 11 snappingly engages the hinge, is generally by a parallel displacement. The guiding function of the guide faces is effective while these components approach the snapping engagement, and also once the engagement has been reached. In the snapped-in position, the resilient clamping of the retainers about the hinges provides a positive hold, which secures the parts with no play. The shield is adapted to the spectacles so that a suitable spacing between the respective glasses is preserved when the shield is in the secured position. Thus, the shield is guided in such way that the shield glasses never unintentionally engage the spectacle glasses.

With a pair of spectacles as explained in the above identified c-i-p application Ser. No. 09/541,789, the lateral, exterior hinge face actually comprises a temple extension, thus the shoe actually contacts a component integral with the temple. As this temple extension is cylindrical and as the shoe comprises a low-friction material, this does not impair the easy turning of the temple in the hinge while the shield remains engaged, snapped into secured position.

Figure 6:
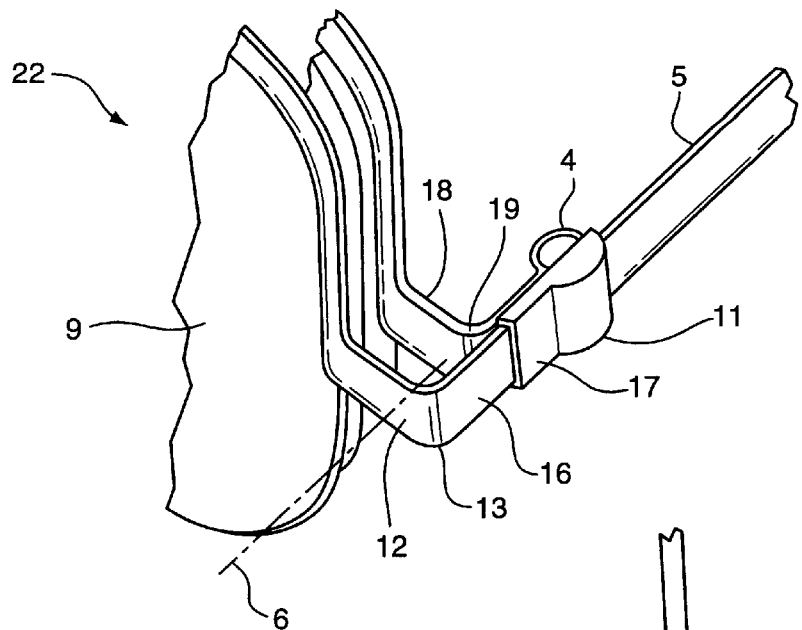
FIG. 6 illustrates an isometric view of a shield according to a second embodiment secured onto a pair of spectacles.
Figure 7:
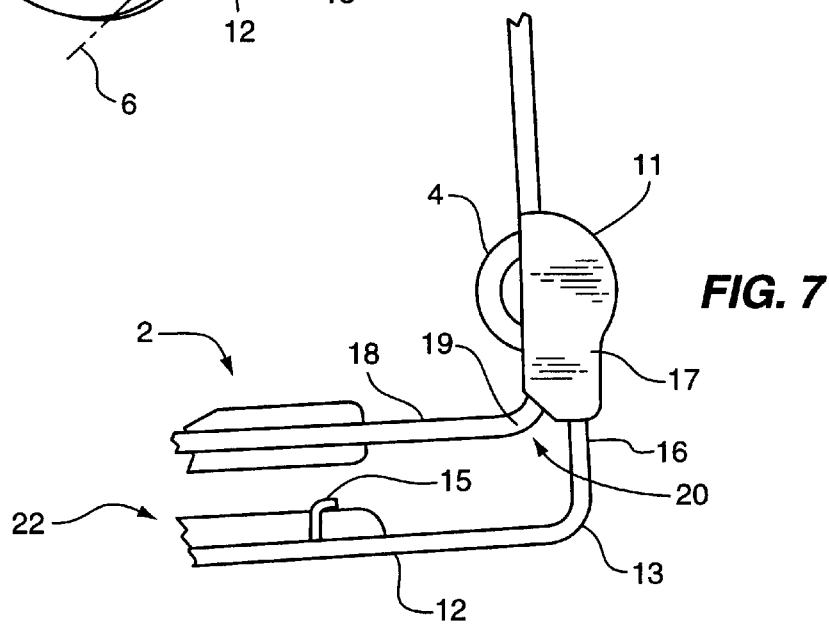
Fig. 7 illustrates a plan view of the detail from FIG. 6.

Reference is now made to FIGS. 6 and 7 for a description of a second embodiment of the shield according to the invention. The shield according to the second embodiment 22 is distinguished over the shield of the first embodiment mainly by the shoe. The shoe 17 according to the second embodiment is longer than is the case with the first embodiment in order that it provides extended guide faces. This extends the guiding engagement in order to provide a more accurate control of the shield inclination relative to the spectacle frame.

The shoe 17 according to the second embodiment is adapted for engaging the shield rearward extension 16 by way of the shoe comprising a suitable aperture which receives the extension 16. The components comprise interlocking protrusions (not shown) adapted to provide a secure snap fitting. The shoe 17 according to the second embodiment provides the rearmost component of the shield, including the retainer. Adaptation of the shield according to the second embodiment 22 in order to achieve different spacings between the shield glasses and the spectacle glasses may be provided simply by supplying a selection of shoes 17 of different lengths. This is a practical advantage since such adaptation may be necessary, e.g. in view of the range of thicknesses by prescription spectacle glasses.

Figure 8:
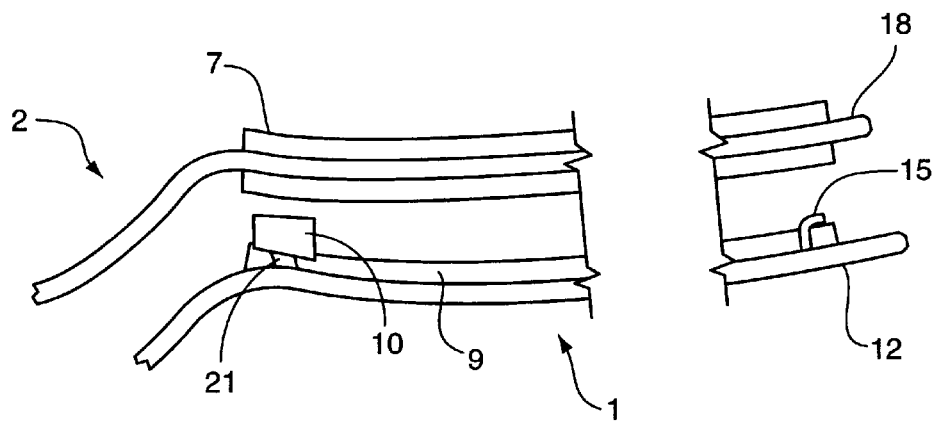
FIG. 8 illustrates a horizontal section of parts of a shield and parts of a pair of spectacles.

Reference is now made to FIG. 8 for a description of details concerning the fitting of the shield glasses relative to the shield beam. The beam 12 provides a rim component which engages a recess along the upper part of the edge of the respective shield glass. The shield glass 9 is also provided with a pair of through-bores. The beam 12 comprises a sheet material which has been suitably cut and shaped so as to provide near the knee a hook 15 which is threaded through a first one of the bores in the glass. Having threaded the glass onto the hook 15, the glass is turned to bring the glass into surface contact with the beam. The beam in the area adjacent the nose region comprises a part which has been bent to provide a lug 21 adapted for engaging a second one of the bores in the glass. In assembled state the glass generally resides in surface contact with the beam with the lug 21 received in the second bore.

The head of the lug 21 is also provided with enlargements or with barbs (not shown), in order that a pad 10 comprising plastics and provided with a suitable bore may be engaged on the end of the lug 21 where it is retained by the barbs. The pad comprises a plastics material, such as polycarbonate. It secures the glass and it also provides a spacer means vis-a-vis the spectacle glass 7 in the region generally adjacent the nose bridge.

Figure 9:
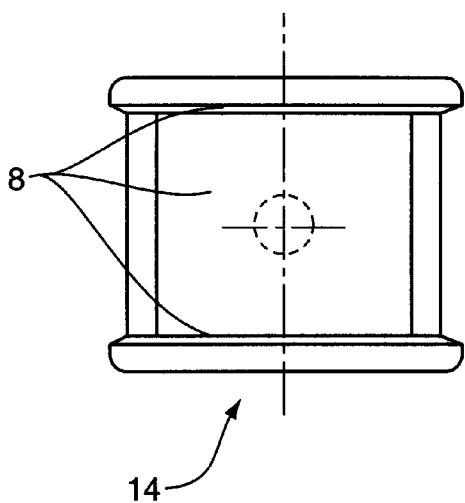
FIG. 9 shows a front view of a component for the shield according to the first embodiment.
Figure 10:
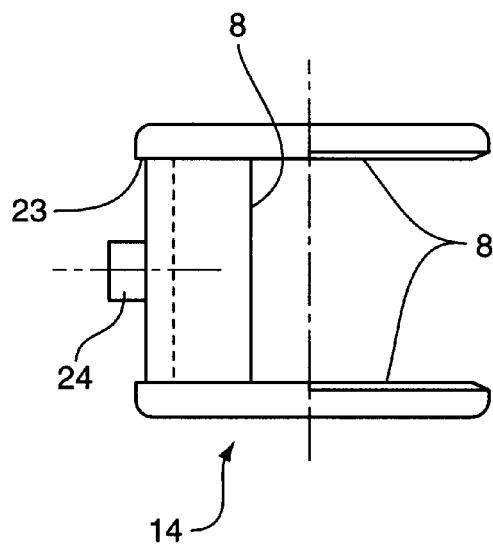
FIG. 10 shows the component from FIG. 9 in side elevation.

Reference is now made to FIGS. 9 and 10 for a description of the shoe 14 according to the first embodiment, FIG. 9 showing a front elevation, and FIG. 10 showing a side elevation. As illustrated in FIG. 10, the shoe 14 provides guide faces 8 in a generally U-shaped arrangement adapted to engage the upper edge, the lower edge, and the lateral face of the spectacle frame extension. The shoe 14 on the side opposite the guide faces 8 also comprises a shallow recess 23 with a knob 24.

This recess provides a mating engagement with the rearwardmost part of the shield frame extension which is suitably rounded such as illustrated in FIG. 3. The knob 24 is received in a bore 25 (illlustrated in FIG. 4) in order to secure the shoe.

Although specific embodiments have been described above to illustrate the invention, it is to be understood that such embodiments are exemplary only and not in any way intended to limit the invention which may be widely varied by a person skilled in the art without departing from the scope of the appended claims.

I claim:

1. A clip-on shield for a pair of spectacles, which pair of spectacles comprises a pair of spectacle glasses, a spectacle frame with lateral portions, which lateral portions provide frame guide faces oriented generally perpendicular to the plane of the spectacle glass surfaces, and temples connected with the spectacle frame by hinges, said shield comprising a shield frame, shield glasses, lock means for securing said shield to the spectacle frame and shield guide faces, wherein said shield guide faces are adapted for cooperation with the frame guide faces so as to permit sliding said shield along a direction generally perpendicular to the plane of the spectacle glass surfaces and into a secured position, while preserving the mutual orientation of said shield and the spectacle glasses during a final stage of approach.

2. The shield according to claim 1, comprising spacer means adapted to maintain a spacing between said shield glasses and the spectacle glasses.

3. The shield according to claim 2, wherein said spacer means comprises a pad of a soft material adapted for engaging a back side of at least one of said shield glasses and for providing a base for securing a part of said shield frame to said at least one shield glass.

4. The shield according to claim 1, wherein said lock means comprises a resilient means and a pair of retainers, each one of said retainers being adapted for engaging the pair of spectacles at a zone adjacent a respective one of said hinges.

5. The shield according to claim 4, wherein said resilient means comprises a strip of resilient plate.

6. The shield according to claim 1, wherein said shield guide faces are provided by a pair of slide blocks, each one of said slide blocks being adapted for engaging respective frame guide faces adjacent a respective one of said hinges.

7. The shield according to claim 6, wherein each of said slide blocks comprises a shoe of low friction, resilient material.

8. The shield according to claim 7, wherein said shoe is adapted for snap fitting engagement with a respective extension of said shield frame.

9. The shield according to claim 1, comprising protrusions for providing means by which the user can manipulate the shield without the user having to touch the shield glasses.

10. A combination of a removable shield and a pair of spectacles, said pair of spectacles comprising a pair of spectacle glasses, a spectacle frame with lateral portions, which lateral portions provide frame guide faces oriented generally perpendicular to the plane of the spectacle glass surfaces, and temples connected with said spectacle frame by hinges, said shield comprising a shield frame, shield glasses, lock means for securing said shield to said spectacle frame and shield guide faces, wherein said shield guide faces are adapted for cooperation with said frame guide faces so as to permit sliding said shield along a direction generally perpendicular to the plane of said spectacle glass surfaces and into a secured position with said shield glasses generally parallel to the plane of said spectacle glasses, wherein said spectacle guide faces and said shield guide faces are adapted to permit sliding said shield into the secured position, while preserving the mutual orientation of said shield and said spectacle glasses during a final stage of approach.

11. The combination according to claim 10, comprising spacer means adapted to maintain a spacing between said shield glasses and said spectacle glasses.

12. The combination according to claim 11, wherein said spacer means comprises a pad of a soft material adapted for engaging the back side of at least one of said shield glasses and for providing a base for securing a part of said shield frame to said at least one shield glass.

13. The combination according to claim 10, wherein at least one of said pair of spectacles and said shield comprises a resilient means and wherein said lock means comprises a pair of retainers, each one of said retainers being adapted for engaging said pair of spectacles at a zone adjacent a respective one of said hinges.

14. The combination according to claim 13, wherein said resilient means comprises a strip of resilient plate.

15. The combination according to claim 13, wherein said pair of spectacles comprises a first and a second set of guide faces, each set of guide faces defining a respective sliding axis, wherein said sliding axes are oriented with a mutual angle, wherein said resilient means is adapted to be gradually tensioned during application of said shield to said pair of spectacles by sliding, so that said resilient means is tensioned when said shield is in the secured position.

16. The combination according to claim 10, wherein said shield guide faces are provided by a pair of slide blocks, each one of said slide blocks being adapted for engaging respective frame guide faces adjacent a respective one of said hinges.

17. The combination according to claim 16, wherein each of said slide blocks comprises a shoe of low friction, resilient material.

18. The shield according to claim 17, wherein said shoe is adapted for snap fitting engagement with a respective extension of said shield frame.

19. The combination according to claim 10, comprising protrusions for providing means by which the user can manipulate said shield without the user having to touch said shield glasses.

* * * * *